(12) United States Patent
Kikuchi

(10) Patent No.: US 11,710,013 B2
(45) Date of Patent: Jul. 25, 2023

(54) PRINTING SYSTEM, PRINTING METHOD, AND PROGRAM

(71) Applicant: CANON KABUSHIKI KAISHA, Tokyo (JP)

(72) Inventor: Hiroshi Kikuchi, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/387,753

(22) Filed: Jul. 28, 2021

(65) Prior Publication Data

US 2022/0036144 A1 Feb. 3, 2022

(30) Foreign Application Priority Data

Jul. 31, 2020 (JP) ................. 2020-130028

(51) Int. Cl.
| | |
|---|---|
| *G06F 15/00* | (2006.01) |
| *G06K 15/02* | (2006.01) |
| *G06F 3/12* | (2006.01) |
| *H04N 1/00* | (2006.01) |

(52) U.S. Cl.
CPC ....... *G06K 15/1809* (2013.01); *G06F 3/1232* (2013.01); *G06F 3/1239* (2013.01); *H04N 1/0048* (2013.01); *H04N 1/00482* (2013.01); *G06F 3/1294* (2013.01)

(58) Field of Classification Search
CPC . G06K 15/1809; G06F 3/1232; G06F 3/1239; G06F 3/1294; H04N 1/0048; H04N 1/00482
USPC ..................................................... 358/1.15
See application file for complete search history.

(56) References Cited

U.S. PATENT DOCUMENTS

| | | | |
|---|---|---|---|
| 2010/0118321 A1* | 5/2010 | Ebuchi .............. | G06F 3/1205 358/1.9 |
| 2012/0086975 A1* | 4/2012 | Ozaki ............... | G06F 3/1257 358/1.15 |
| 2018/0074760 A1* | 3/2018 | Matsuura .......... | G06F 3/1204 |

FOREIGN PATENT DOCUMENTS

JP 2012099087 A 5/2012

\* cited by examiner

*Primary Examiner* — Mark R Milia
(74) *Attorney, Agent, or Firm* — Canon U.S.A., Inc. IP Division

(57) ABSTRACT

Embodiments of the present disclosure are configured to allow a general user to select a preset setting as much as possible even when some of print setting items are lock-set by an administrator user. Accordingly, even when the print setting item is lock-set, the general user may select a preset setting as long as there is no conflict.

16 Claims, 18 Drawing Sheets

| Print setting / Preset | Document size | Output sheet size | Number of copies | Page layout | Specified magnification | Color mode | Stamp |
|---|---|---|---|---|---|---|---|
| Default setting | A4 | Same as document size | 1 | 1 in 1 | 100% | Auto | No |
| Output size, A4 fixed | A4 | A4 | 1 | 1 in 1 | 100% | Auto | No |
| 2 in 1 | A4 | Same as document size | 1 | 2 in 1 | 100% | Auto | No |
| Monochrome text | A4 | Same as document size | 1 | 1 in 1 | 100% | Monochrome | No |
| Secret | A4 | Same as document size | 1 | 1 in 1 | 100% | Auto | Secret |

PRINTING SYSTEM, PRINTING METHOD, AND PROGRAM

BACKGROUND

Field of the Disclosure

The present disclosure relates to a printing system, a printing method, and a program that enable collective selection of setting values for a plurality of setting items.

Description of the Related Art

To cause a printer to perform printing from an information processing apparatus such as a computer, software generally called a printer driver is used. A printer driver is software that runs when printing is performed from any application and can accept various print settings selected by the user on a unique user interface (UI).

Conventionally, printing systems having a "preset" function used for collectively specifying a plurality of print setting items are known. In such a printing system, once the user selects one of a plurality of "presets", it is possible to collectively apply setting values of a plurality of print setting items associated with the preset to the print setting (see Japanese Patent Application Laid-Open No. 2012-99087, for example).

Further, in the printing system of Japanese Patent Application Laid-Open No. 2012-99087, use of setting values which are not allowed for general authority users to use, such as simplex printing, color printing, or 1 in 1, for example, can be set to be disabled by an administrator. The administrator may permit use of only the setting value of simplex printing for a print setting item of duplex/simplex setting, for example. Further, for a "preset" including a setting value disabled for use, use by the general authority users is automatically set to not-permitted.

On the other hand, some printing systems have a function of setting a lock for a print setting item to lock the print setting item to a setting value set in a print setting window. A lock can be set for each print setting item such as print layout, color/monochrome, or the like. When a lock of a print setting item is set, the lock-set print setting item is locked (fixed) to a setting value stored at the point of time. Such a lock function is used mainly for the user having an administrator authority to impose restriction for use of print setting on the general users.

SUMMARY

Herein, in a printer driver that can use both the "preset" function and the lock setting of print setting items described above, a setting value set as a preset and a locked setting value may conflict with each other. Accordingly, to prevent both setting values from conflicting, in some cases, selection of a preset setting may be disabled when the lock function is set to be enabled. In some cases, however, a preset setting and a lock setting do not conflict with each other even when the lock is set, it is therefore preferable to enable selection of the preset as much as possible.

According to embodiments of the present disclosure, a printing system includes: a setting unit configured to set one or multiple pieces of first setting information in which setting values were collectively selected for a plurality of setting items; a fixing unit configured to fix a setting value to a value stored at a particular point of time for one or more specified setting items of the setting items; a generating unit configured to generate second setting information based on the first setting information and the fixed setting value; and a printing unit configured to perform printing based on the second setting information.

Further features of the present disclosure will become apparent from the following description of exemplary embodiments with reference to the attached drawings.

DESCRIPTION OF THE EMBODIMENTS

Embodiments of the present disclosure will be described below with reference to the drawings. However, the embodiments described below are mere examples and are not intended to limit the scope of the present disclosure to these embodiments. Further, all the combinations of features described in the following embodiments are not necessarily required for the solution of the present disclosure.

First Embodiment

Figure 1:
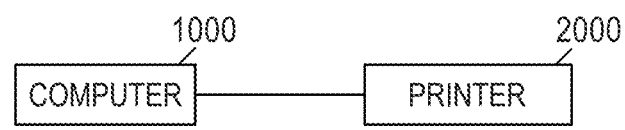
FIG. 1 is a diagram illustrating a connection form of a printing system.

FIG. 1 is a diagram illustrating an example of a connection form between a computer 1000 and a printer 2000 in a printing system of a first embodiment. The computer 1000 is formed of an information processing apparatus such as a personal computer, for example. Further, the printer 2000 is formed of a printing apparatus such as a multifunction peripheral (MFP) or the like, for example. The computer 1000 and the printer 2000 are connected via a Universal Serial Bus (USB), a network, or the like and can communicate with each other. Note that the printing system may be configured such that a plurality of computers 1000 are connected to a single printer 2000.

Figure 2:
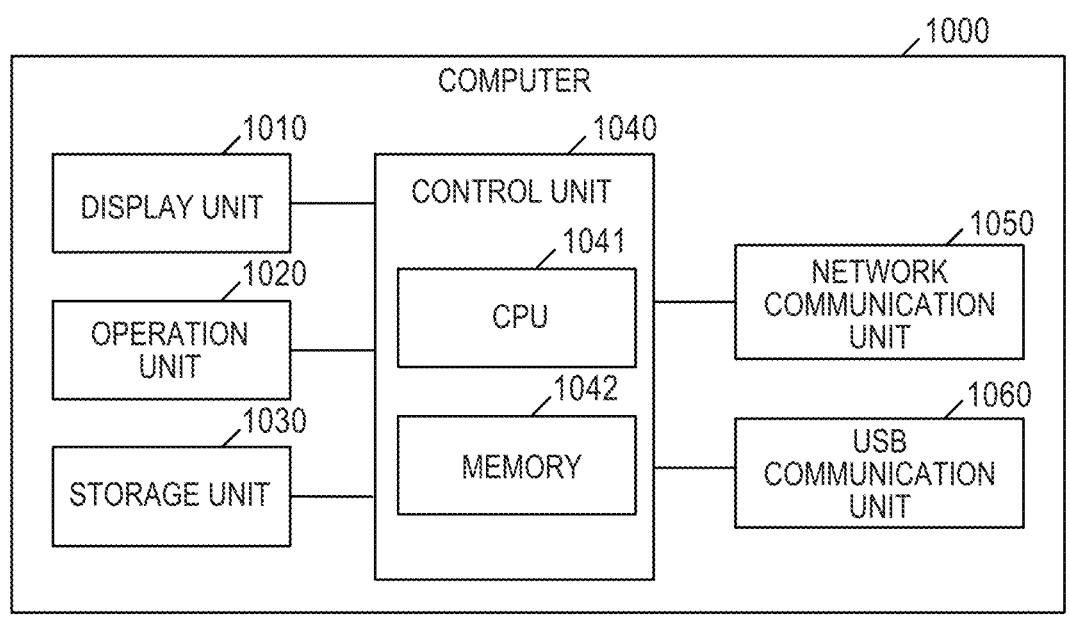
FIG. 2 is a block diagram illustrating a hardware configuration of a computer.

FIG. 2 is a block diagram illustrating a hardware configuration of the computer 1000. The computer 1000 is entirely controlled by a control unit 1040 formed of a central processing unit (CPU) 1041 and a memory 1042. A display unit 1010 is formed of an output device such as a display. An operating unit 1020 is formed of an input device such as a mouse, a keyboard, a touch panel, or the like. Further, a storage unit 1030 is formed of a storage medium such as a hard disk or a solid state drive (SSD) and stores various software components required in the operation of the computer 1000. These software components are loaded into the memory 1042 if necessary and executed by the CPU 1041.

A network communication unit 1050 is connected to a network to perform input/output of data from/to an external apparatus (not illustrated). A USB communication unit 1060 performs input/output of data from/to an external apparatus via a USB connection. A software process in the present embodiment is implemented when software stored in the storage unit 1030 is loaded into the memory 1042 of the control unit 1040 and executed by the CPU 1041.

Figure 3:
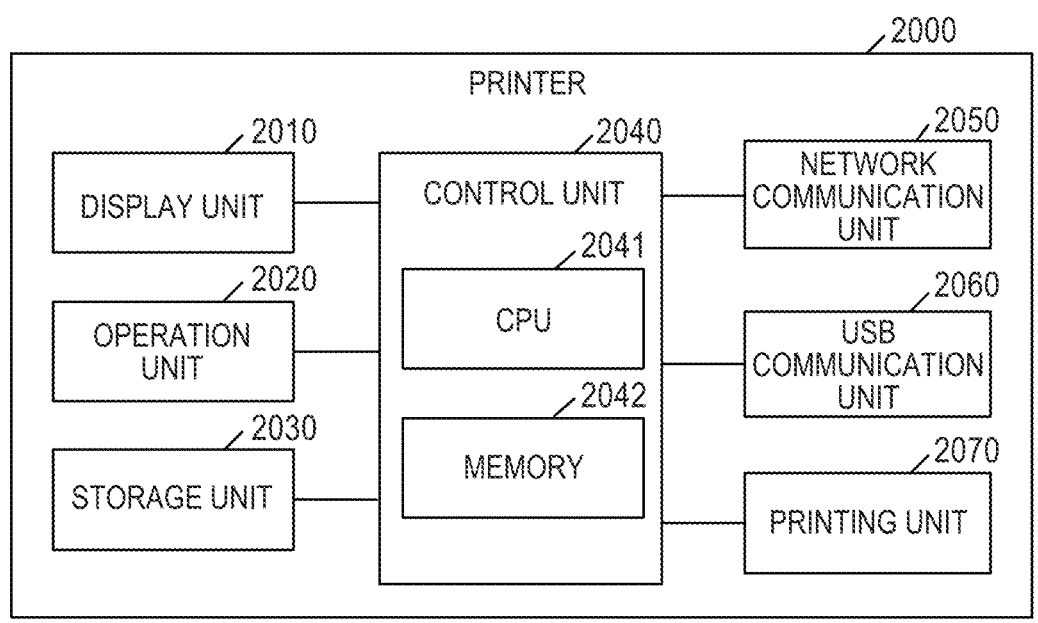
FIG. 3 is a block diagram illustrating a hardware configuration of a printer.

FIG. 3 is a block diagram illustrating a hardware configuration of the printer 2000. The printer 2000 is entirely controlled by a control unit 2040 formed of a CPU 2041 and a memory 2042. A display unit 2010 is formed of an output device such as a liquid crystal panel. An operating unit 2020 is formed of an input device formed of a touch panel or various buttons. Further, a storage unit 2030 is formed of a storage medium such as a hard disk or as SSD and stores various software components required in the operation of the printer 2000. These software components are loaded into the memory 2042 if necessary and executed by the CPU 2041.

A network communication unit 2050 is connected to a network to perform input/output of data from/to an external apparatus. A USB communication unit 2060 performs input/output of data from/to an external apparatus via a USB connection. A printing unit 2070 prints digital data stored in the storage unit 2030 or the memory 2042 on a physical sheet in accordance with an instruction of the control unit 2040. As a printing method, an ink scheme, a toner scheme, or other schemes can be used.

Figure 4:
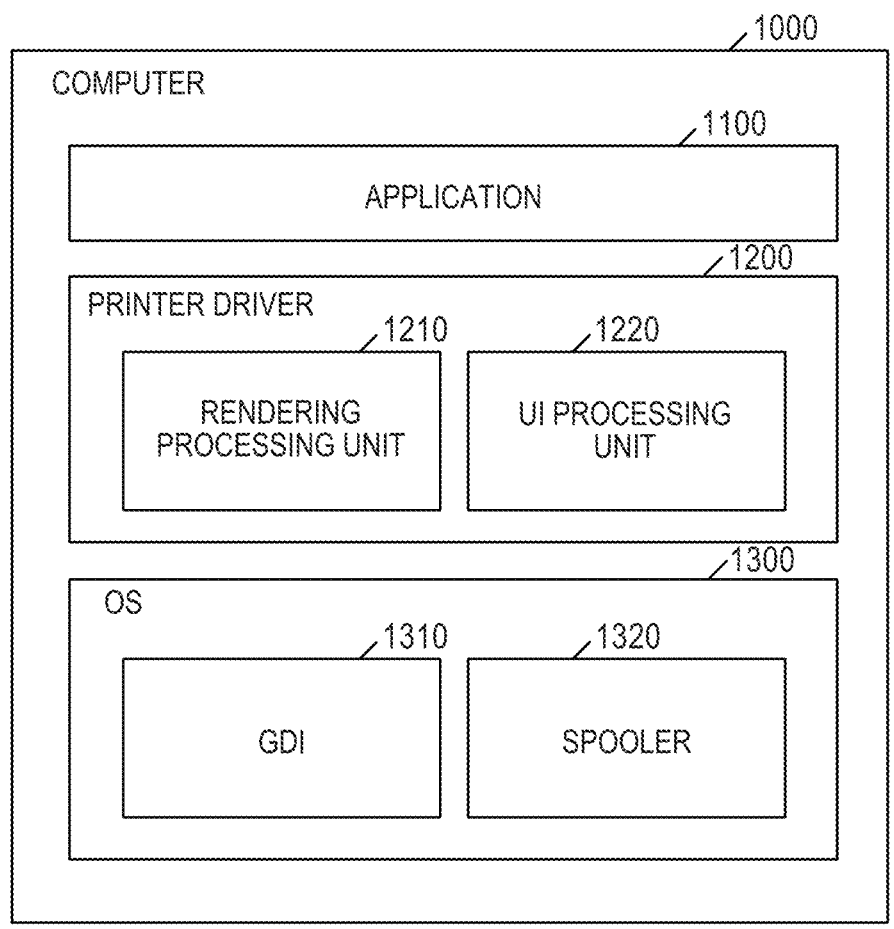
FIG. 4 is a block diagram illustrating a software configuration of a computer related to a print process.

FIG. 4 is a block diagram illustrating a software configuration related to a print process performed by the computer 1000. An application 1100 represents any software such as word processing software or spreadsheet software and has a print function. The user may allow the computer 1000 to perform the print function prepared by the application 1100 to print information or the like displayed on the display unit 1010 of the computer 1000 via the printer 2000. A printer driver 1200 displays, on a user interface (UI), a print setting that can be implemented by using the printer 2000. Further, in printing, the printer driver 1200 generates rendering data (Page Description Language (PDL)) interpretable by the printer 2000. In the printer driver 1200, a UI processing unit 1220 is used mainly when a print setting is displayed or changed. Further, a rendering processing unit 1210 is used mainly when a PDL is generated.

Operating system (OS) 1300 is software responsible for basic operation of the computer 1000. The application 1100 and the printer driver 1200 are both managed by the OS 1300 and can be used by being installed in the OS 1300. A graphics device interface (GDI) 1310 is a component inside the OS 1300 that externally provides interface related to rendering such as display indication or printing. A spooler 1320 performs a process of transmitting print data to the printer 2000.

Figure 5:
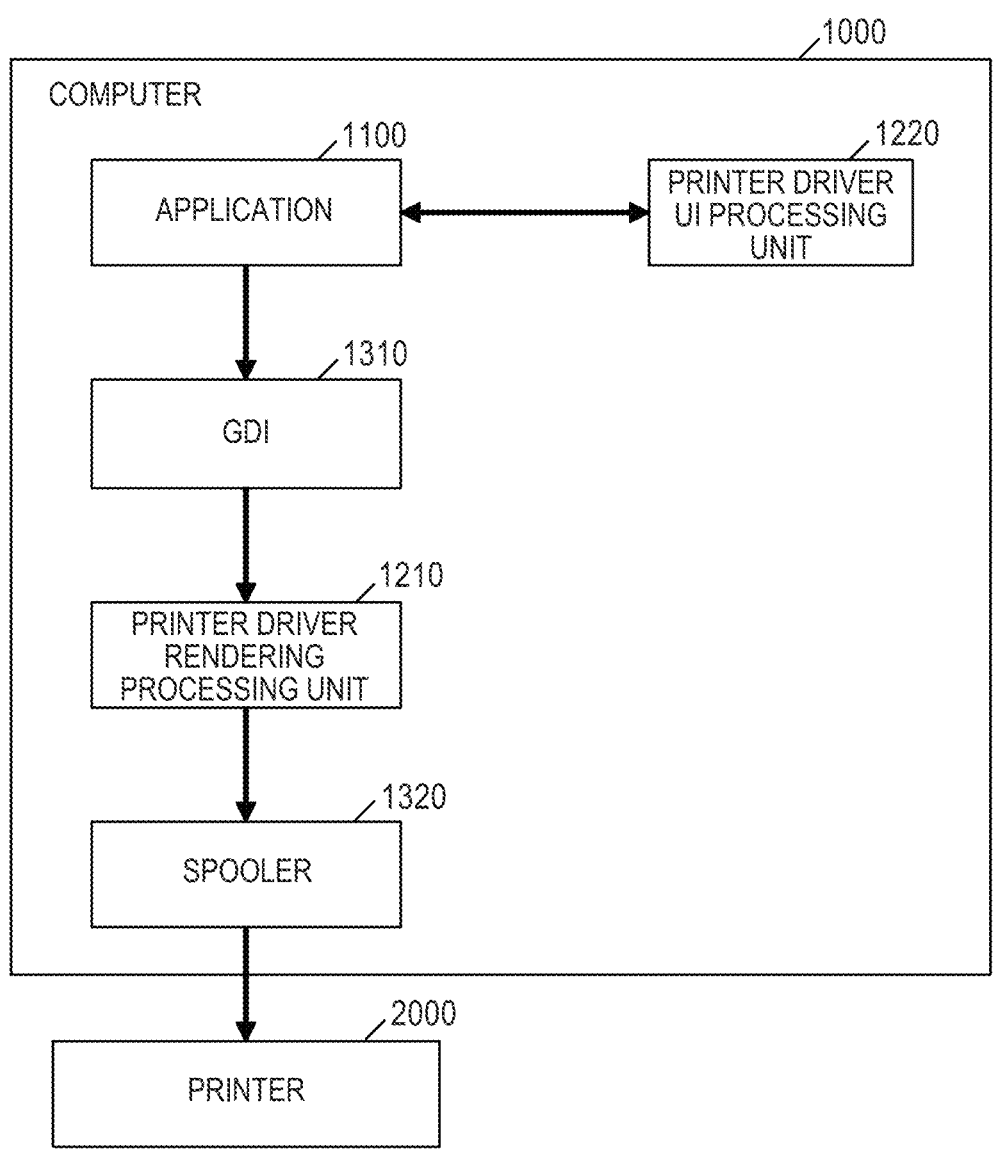
FIG. 5 is a diagram illustrating an overview of a flow of a print process.

Next, an overview of a flow of the print process will be described with reference to FIG. 5. The application 1100 calls the UI processing unit 1220 of the printer driver 1200 before performing a print process and allows the user to input a print setting. The user may set any print setting by using the UI displayed by the UI processing unit 1220 of the printer driver 1200. The application 1100 then calls a rendering instruction that is a print content to the GDI 1310 together with a print setting acquired from the UI processing unit 1220. The GDI 1310 converts the acquired print setting and the rendering instruction into an instruction interpretable for the printer driver 1200 and calls the rendering processing unit 1210 of the printer driver 1200. The rendering processing unit 1210 of the printer driver 1200 converts the print setting and the rendering instruction acquired from the GDI 1310 into a PDL interpretable for the printer 2000 and passes the PDL to the spooler 1320. The spooler 1320 transmits the received PDL to the printer 2000. The printer 2000 converts the acquired PDL into image data and prints the image data on an actual physical sheet by using a printing unit 2070.

Figure 6:
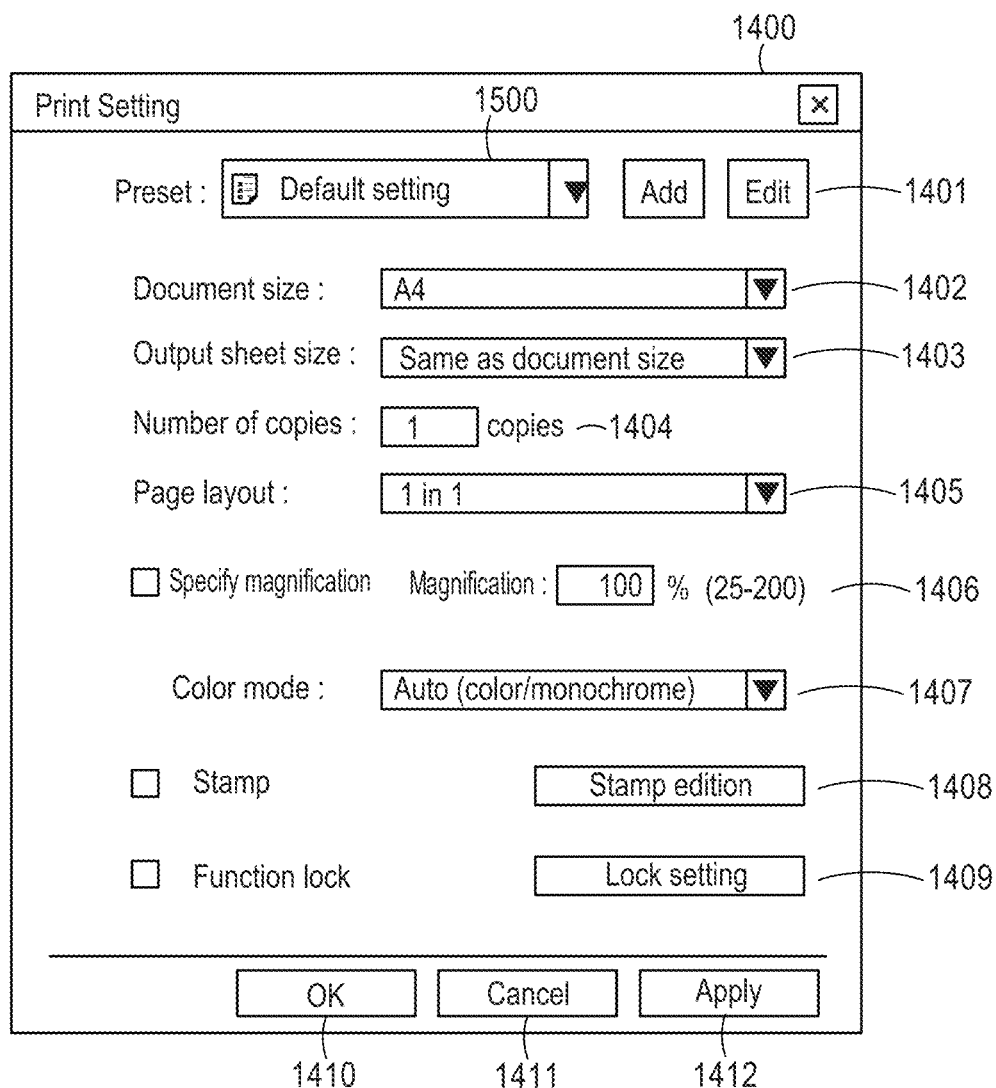
FIG. 6 illustrates an example of a print setting UI.

FIG. 6 illustrates an example of a print setting UI 1400 displayed by the UI processing unit 1220. The user may specify desired print setting information by operating the print setting UI 1400. When called from a setting window of the OS 1300, the print setting UI 1400 is used for specifying a default print setting at printing from all the applications 1100. On the other hand, when called from the application 1100, the print setting UI 1400 is used for specifying a temporal print setting used in the application.

Respective print setting items forming print setting information will be described here. Document size 1402 indicates a sheet size of document data to be printed, which indicates a sheet size for printing performed by the application 1100. Output sheet size 1403 indicates a sheet size of an actually discharged output sheet, and "Same as document size" is typically used as a setting value. When another specific output sheet size is selected, scaling is performed by the printer driver or the printer in accordance with a size ratio of the document size and the output sheet size, and printing is performed.

The number of copies 1404 is used when multiple copies of the same print material are printed. Page layout 1405 indicates how many document pages to be printed in one physical sheet. Although the typical setting value is "1 in 1", when "N in 1" (N is a predefined integer value) is specified, N document pages are reduced or aggregated into one physical sheet and printed. Magnification 1406 is used when a desired percentage is specified to perform enlarged/reduced printing. Color mode 1407 is used mainly when monochrome printing is performed from color data. Stamp 1408 represents a function of enabling additional printing of a desired character string separately from the rendering data instructed by the application 1100. For example, a preset setting value such as "Secret" or "Confidential" can also be selected.

Preset 1401 is not a print setting item unlike what has been described above but an item used for selecting a preset setting and collectively setting the print setting items described above together. In the preset 1401, a preset setting may be selected, and a new preset setting may be created and used. Details of the function of the preset 1401 will be described later. Similarly, function lock 1409 is not a print setting item but an item used for locking a setting value selected in the print setting item. Details of the function of the function lock 1409 will also be described later.

An OK button 1410 is a button used for saving a print setting set in the print setting UI 1400 and closing the print setting UI 1400. A cancel button 1411 is used for cancelling a print setting set in the print setting UI 1400 and closing the print setting UI 1400. An apply button 1412 is a button used for saving print setting information set in the print setting UI 1400 with the print setting UI 1400 left opened.

Figure 7:
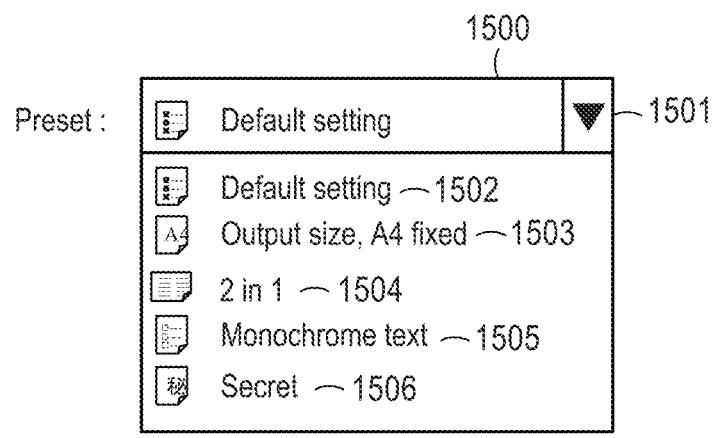
FIG. 7 illustrates an example of a UI displaying a selectable preset setting.

FIG. 7 illustrates an example of a preset setting display UI 1500 that displays selectable preset settings when a preset combo box of the preset 1401 is selected in the print setting UI 1400. The uppermost box indicates a name of a currently selected preset setting. When an individual print setting item has been changed after a preset setting was selected, a character string "<Changed>" may be displayed ahead of the name of the preset setting, or a character string indicating that the preset is not used may be displayed. Preset settings 1502 to 1506 displayed when the button 1501 is pressed are preset settings prepared in advance (preset). The preset setting can be additionally created by the user. The added preset setting is added to the preset combo box and can be selected by the user.

Figure 8:
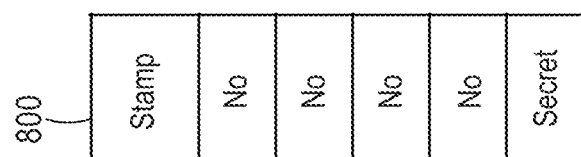
FIG. 8 illustrates an example of a preset setting table.

FIG. 8 illustrates an example of a preset setting table 800 indicating print setting information formed of setting values set for a plurality of print setting items on a preset setting basis. As illustrated in FIG. 8, for each of one or a plurality of presets, the preset setting table 800 is formed of print setting information in which setting values have been collectively selected for all the print setting items as described in FIG. 6 and is stored in the storage unit 2030 or the like. A preset setting additionally created by the user is also added to the preset setting table 800. Once the user selects any preset setting on the preset 1401 of the print setting UI 1400, setting values of print setting items stored in the preset setting table 800 are collectively reflected. The user may specify desired print setting information with less operations without re-selecting setting values of a plurality of print setting items by collectively registering the frequently used setting values as a preset setting in advance.

Note that, in the preset settings illustrated in the preset setting table 800, the print setting information "Default setting" is formed of setting values that have been set as a default after installation of the printer driver for each print setting item. Further, in the preset setting table 800, setting values indicated by Italic characters in other preset settings (for example, "A4" for "Output size, A4 fixed") are setting values that have been changed from their default setting values, respectively.

Figure 9:
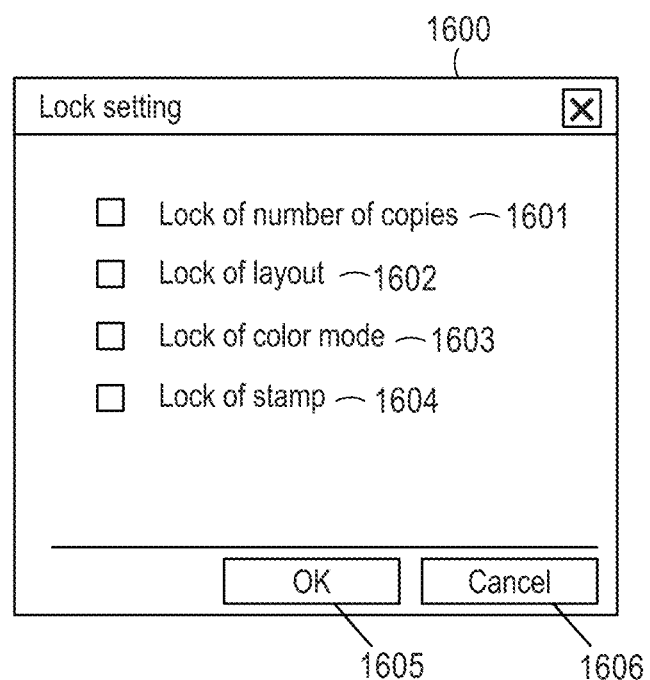
FIG. 9 is a diagram illustrating a lock setting UI.

FIG. 9 illustrates an example of a lock setting UI 1600 used for setting a lock and displayed when a lock setting button of the function lock 1409 is pressed in the print setting UI 1400. The lock setting or setting of a lock means that, for one or a plurality of specified print setting items, one or more setting values are locked (fixed and made unchangeable) to the value stored at a particular point of time (for example, at a point of time a lock is set). A lock is set mainly for the purpose for which a person having administrator authority in the printing system (hereafter, referred to as "administrator user") restricts print settings available to general users. Further, the lock setting UI 1600 may allow only the administrator user having OS administrator authority to perform edition or may provide a password entry box within the lock setting UI 1600, require entry of a password, and allow only the authenticated user to perform edition.

In the lock setting UI 1600, lock of the number of copies 1601 is an item used for locking the number of copies 1404 to a setting value stored at a point of time a lock is set. Lock of layout 1602 is an item used for locking print setting items related to a print layout, that is, the output sheet size 1403, the page layout 1405, and the magnification 1406 to setting values stored at a point of time a lock is set. Lock of color mode 1603 is an item used for locking the color mode 1407 to a setting value stored at a point of time a lock is set. Lock of stamp 1604 is an item used for locking the stamp 1408 to a setting value stored at a point of time a lock is set.

An OK button 1605 is a button used for fixing a setting value for a print setting item corresponding to the item specified in the lock setting UI 1600 to a setting value stored at a point of time a lock is set and closing the lock setting UI 1600. A cancel button 1606 is a button used for discarding the operation result on the lock setting UI 1600 and closing the lock setting UI 1600.

Figure 10:
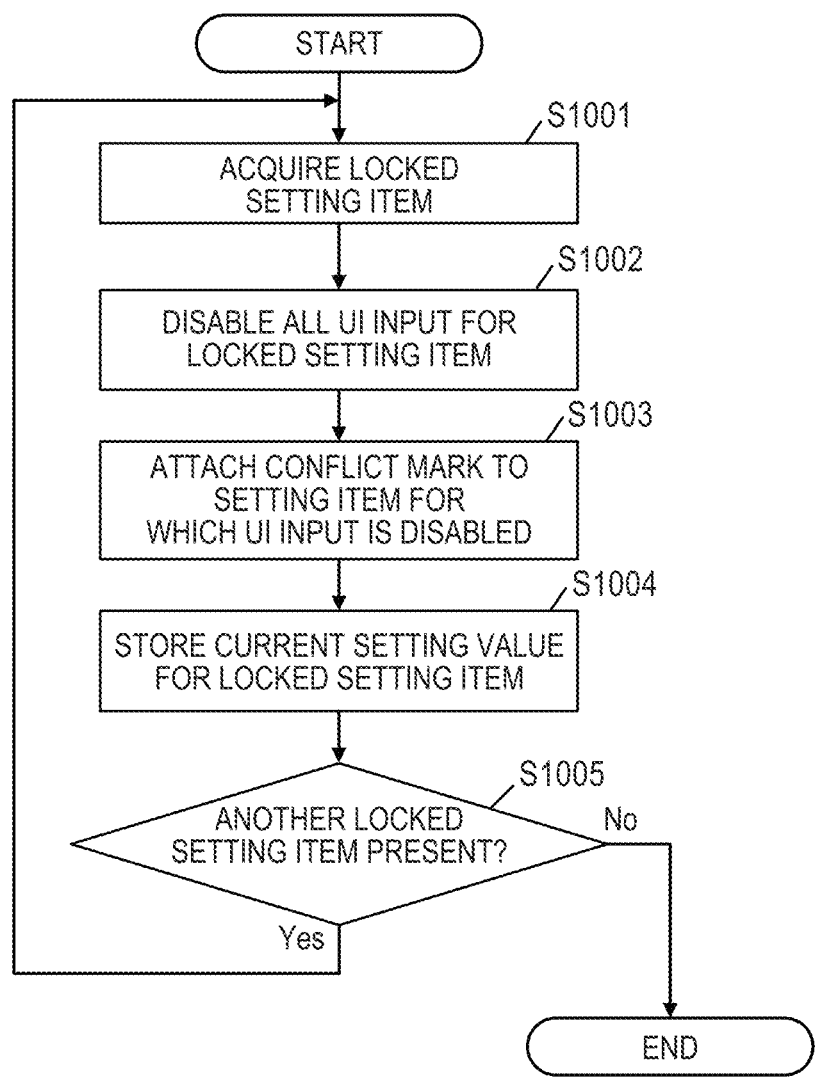
FIG. 10 is a flowchart illustrating a lock setting process.

Next, a lock setting process performed when the OK button 1605 in the lock setting UI 1600 is pressed will be described with reference to FIG. 10. The lock setting process is implemented when the software of the UI processing unit 1220 stored in the storage unit 1030 is loaded into the memory 1042 and executed by the CPU 1041.

In response to the OK button 1605 being pressed, the UI processing unit 1220 acquires a lock-set print setting item (S1001). This is to acquire a print setting item corresponding to the item specified in the lock setting UI 1600. The UI processing unit 1220 then disables all the UI input for the lock-set print setting items (S1002). Note that disabling UI input is to fix a setting value to a value stored at the point of time the lock was set (to make it impossible for the user to change a setting value) and gray out the print setting in the UI display or the like.

Next, the UI processing unit 1220 attaches a conflict mark to all the print setting items for which UI input is disabled in S1002 (S1003). Note that the conflict mark is an icon provided to notify the user that UI input is disabled due to lock setting. Next, the UI processing unit 1220 stores setting values stored at a point of time the lock is set for the lock-set print setting items (S1004). In such a way, when lock is set by an administrator user or the like, setting values set at the point of time the lock was set are locked (fixed) for the print setting items corresponding thereto.

Next, the UI processing unit 1220 confirms whether or not another lock-set print setting item is present (S1005). If another lock-set print setting item is present (S1005, Yes), the process returns to S1001 and repeats the process described above. If no other lock-set print setting item is present (S1005, No), the lock setting process ends.

Figure 11:
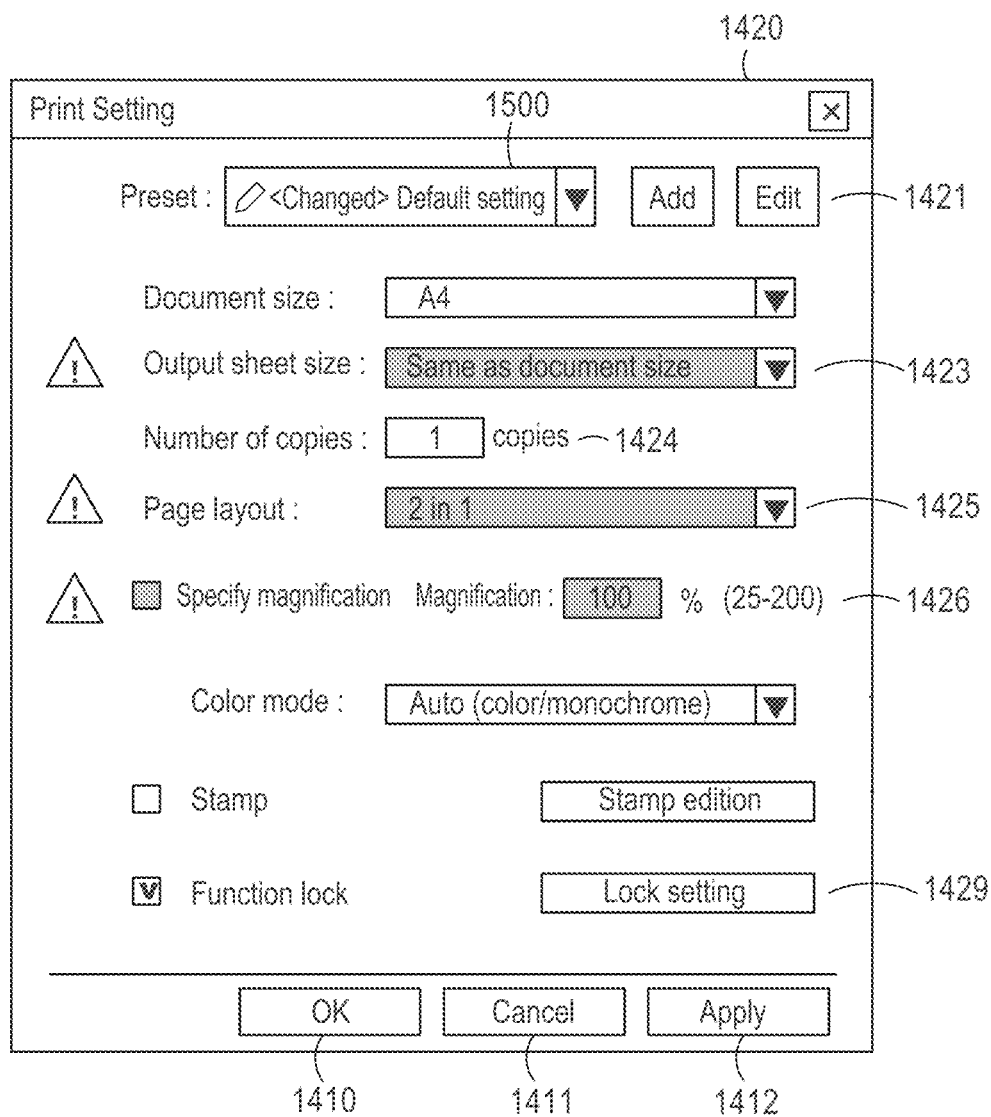
FIG. 11 illustrates an example of a print setting UI when a lock is set.

FIG. 11 illustrates an example of a print setting UI 1420 displayed when the administrator user or the like checks the lock of layout 1602 out of the print setting items and presses the OK button 1605 to set a lock in the lock setting UI 1600. In the example of the print setting UI 1420, for the output sheet size 1423, the page layout 1425, and the magnification 1426, which are print setting items related to a layout, the setting values are locked (fixed) and grayed out to be made unchangeable. Note that, for the output sheet size 1423 and the magnification 1426, default setting values are locked (fixed) without change. Further, for the page layout 1425, the default setting value "1 in 1" has been changed to "2 in 1", and the change is locked (fixed). Further, the function lock 1429 is checked because the lock has been set.

In the print setting UI 1420, an icon of "!" mark provided to the left side of each of the fixed print setting items is a conflict mark described above. The user is unable to change the setting value for the print setting item provided with the conflict mark. Note that, when the user presses the conflict mark, a window (not illustrated) indicating the enabled a lock setting out of the lock settings indicated in the lock setting UI 1600 and information on the setting value made unchangeable is displayed as a popup.

Note that, due to a change from the default setting value of "Default setting" to "2 in 1" for the page layout 1425, a character string "<Changed>" is added to the head of the character string "Default setting" displayed in the preset setting 1421. This indicates that the current print setting information differs from "Default setting" of the preset setting. Note that, in the first embodiment, all the other preset settings as illustrated in FIG. 7 are also displayed in the preset combo box of the preset setting 1421 so that the user can select these preset settings.

Figure 12:
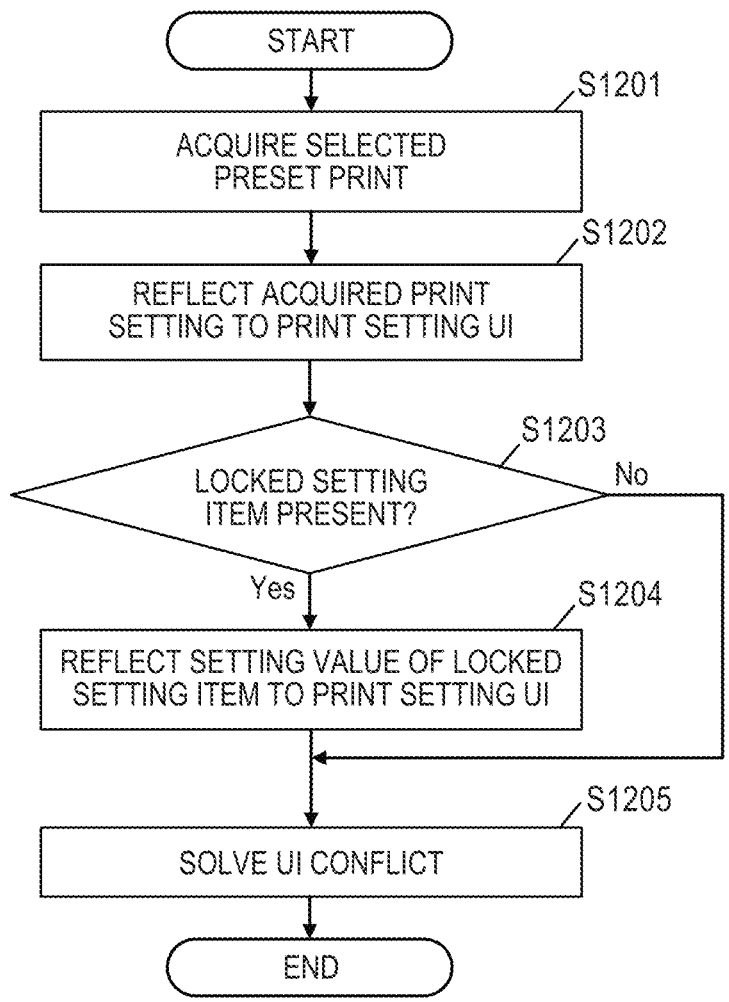
FIG. 12 is a flowchart illustrating a print setting UI generation process when a preset setting is selected.
Figure 13:
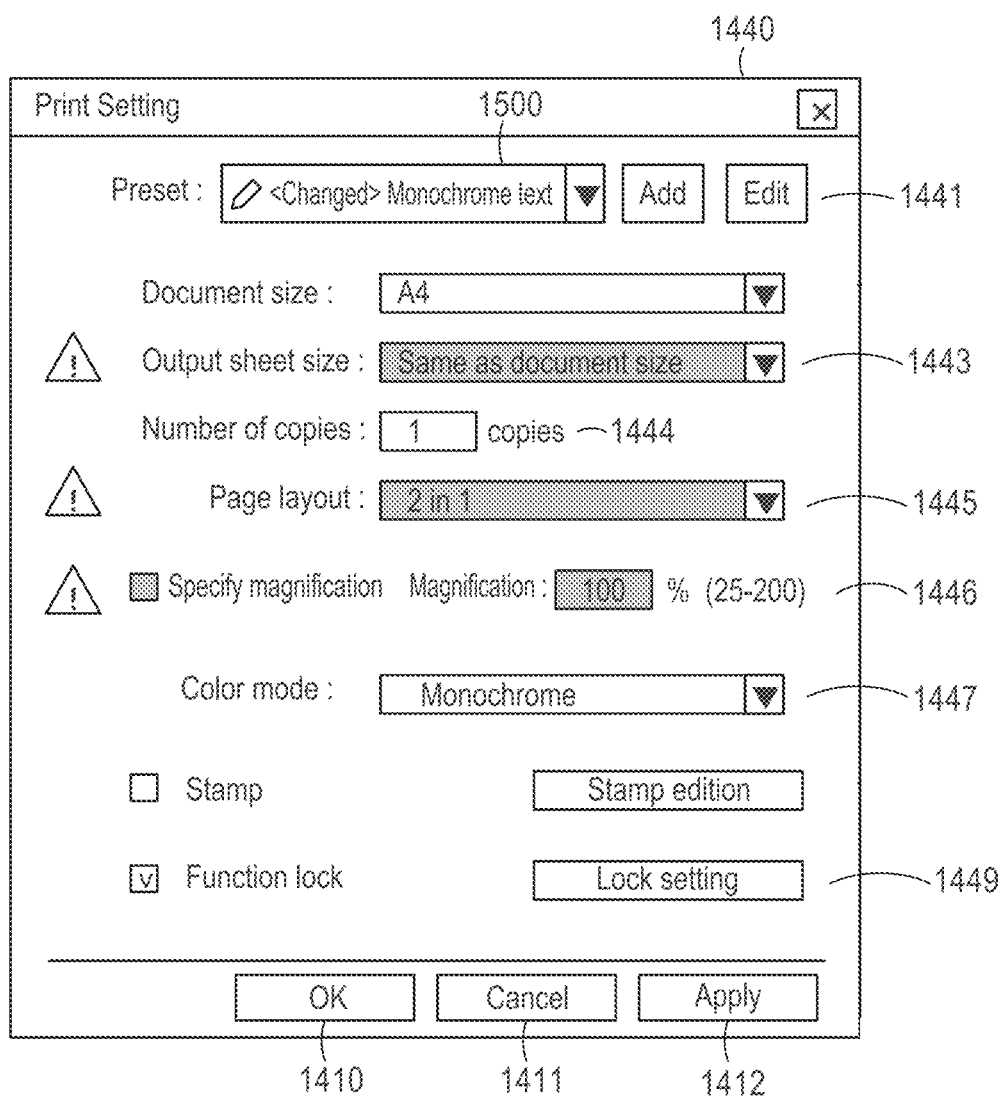
FIG. 13 illustrates an example of a print setting UI when a preset setting is selected.

Next, a print setting UI generation process of generating a print setting UI 1440 as illustrated in FIG. 13 described later when the user selects any preset setting 1421 in a lock-set state as illustrated in FIG. 11 will be described with reference to FIG. 12. The process described here is implemented when the software of the UI processing unit 1220 stored in the storage unit 1030 is load into the memory 1042 and executed by the CPU 1041.

First, the UI processing unit 1220 acquires setting values of respective print setting items for a selected preset setting (S1201). Specifically, setting values of respective print setting items are acquired from the preset setting table 800 for the selected preset in the print setting UI 1420. The UI processing unit 1220 then reflects the acquired setting values to the print setting UI 1440 (S1202). Note that the process so far is the same as the process performed when the typical preset function is used.

Next, the UI processing unit 1220 confirms whether or not a lock-set print setting item is present (S1203). If a lock-set setting item is present (S1203, Yes), the UI processing unit 1220 reflects, to the print setting UI, the setting value stored at the point of time the lock was set for the lock-set setting item (S1204). Specifically, the setting values stored in step S1004 of the flowchart of FIG. 10 are reflected to the print setting UI 1440. In the case of the example illustrated in FIG. 11, the output sheet size 1423 is set to "Same as document size", the page layout 1425 is set to "2 in 1", and the magnification 1426 is set to "100%", and these setting values are reflected to the UI. Accordingly, print setting information is generated in which the setting values have been changed for respective print setting items of the output sheet size, the page layout, and the specified magnification among print setting information indicated in FIG. 8 for the "Default setting".

The UI processing unit 1220 then solves a conflict, if any, for other print setting items. Note that this process can be performed by a known method of solving a UI conflict (S1205). The print setting UI generation process then ends.

If no lock-set setting item is present (S1203, No), the UI processing unit 1220 solves a conflict, if any, for other print setting items (S1205). The print setting UI generation process then ends.

FIG. 13 is an example of the print setting UI 1440 displayed when the "Monochrome document" 1505 is selected in the preset combo box of the preset setting 1421 of the print setting UI 1420 illustrated in FIG. 11. The setting value illustrated in FIG. 13 is the setting value acquired from setting values of respective print setting items for preset setting "Monochrome document" of the preset setting table 800 in step S1202 of the flowchart of FIG. 12. Note that the setting value for the color mode 1447 is changed to "Monochrome" at a point of time of step S1202.

Then, in step S1204, the output sheet size 1443, the page layout 1445, and the specified magnification 1446 are set to pre-stored setting values and reflected to the print setting UI 1440. Further, because the setting value of "Monochrome document" has been changed to "2 in 1" for the page layout 1445, the character string "<Changed>" is added to the head of the character string "Monochrome document" displayed in the preset setting 1441.

As described above, the first embodiment is configured to make the preset setting available after reflecting the current setting values to the lock-set print setting items without making the preset setting non-selectable even when some of the print setting items are lock-set. Accordingly, the user is able to select the preset setting as long as there is no conflict even when some print setting items are lock-set.

Second Embodiment

In the first embodiment, the example in which all the registered preset settings are made selectable in a print setting UI even when some of print setting items are lock-set has been described. In contrast, the second embodiment describes an example in which only the preset setting having the same setting value as the locked setting value is made selectable. Note that, since description for FIG. 1 to FIG. 11 is the same as that in the first embodiment, the description thereof will be omitted here.

Figure 14:
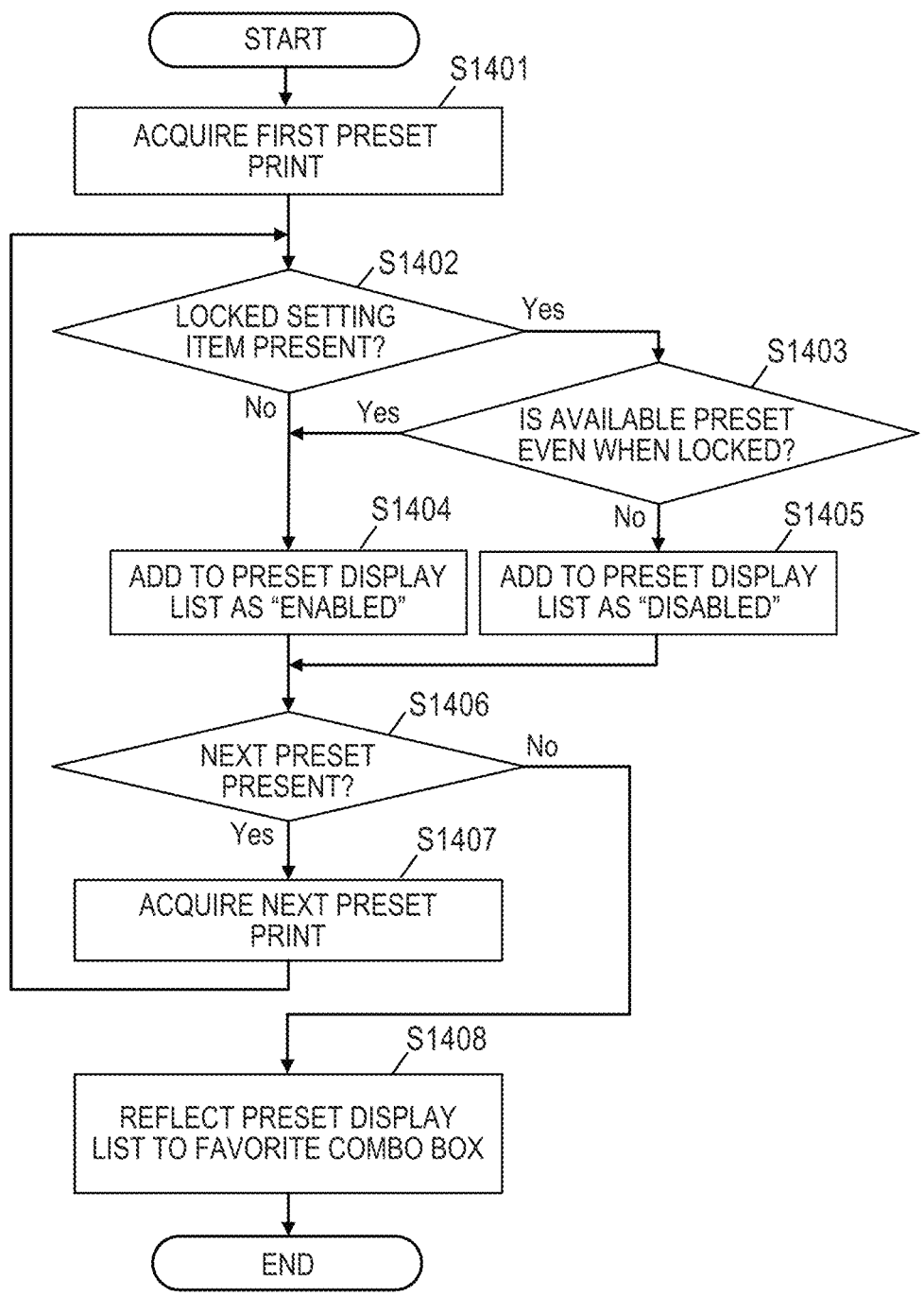
FIG. 14 is a flowchart illustrating a preset setting display process (second embodiment).

FIG. 14 is a flowchart illustrating a preset setting display process of displaying selectable preset setting when any of the print setting items is lock-set in the lock setting UI 1600. The process described here is implemented when the software of the UI processing unit 1220 stored in the storage unit 1030 is loaded into the memory 1042 and executed by the CPU 1041.

First, the UI processing unit 1220 acquires setting values of respective print setting items for a first selected preset setting (S1401). Next, the UI processing unit 1220 confirms whether or not a lock-set print setting item is present (S1402).

If a locked print setting item is present (S1402, Yes), the UI processing unit 1220 determines whether or not the acquired preset setting is available even if the acquired preset setting is lock-set (S1403). This determination method will be described later with reference to FIG. 15. If it is determined that the preset setting is unavailable (S1403, No), the UI processing unit 1220 adds the preset setting of interest to a preset display list (not illustrated) as "disabled" (S1405). Making a preset setting "disabled" is to make it impossible for the user to select the preset setting while displaying the preset setting as one of choices.

On the other hand, if no lock-set print setting item is present (S1402, No), the UI processing unit 1220 adds the preset setting of interest to the preset display list as "enabled" (S1404). Further, if it is determined that the acquired preset setting is available (S1403, Yes) even if a lock-set print setting item is present (S1402, Yes), the UI processing unit 1220 adds the preset setting of interest to the preset display list as "enabled" (S1404). Making a preset setting "enabled" is to display the preset setting of interest as one of choices so that the user can select the preset setting.

The UI processing unit 1220 then confirms whether or not a next preset setting is present (S1406). If the next preset setting is present (S1406, Yes), the UI processing unit 1220 acquires setting values of respective print setting items for the next preset setting (S1407), and the process returns to step S1402. If the next preset setting is not present (S1406, No), the UI processing unit 1220 reflects the preset display list, which has been created so far, to the preset combo box (S1408).

In this step, for a preset setting displayed as "disabled", a preset combo box is generated together with a reason for being disabled indicating which lock-set item in the lock setting UI 1600 has caused "disabled". Accordingly, when the user intends to select a "disabled" preset setting, displaying a reason for being disabled to the user allows the user to know why the preset setting of interest is not selectable. Note that, the preset setting display process of FIG. 14 may be performed after the lock setting process (FIG. 10) performed in response to pressing of the OK button 1605 of the lock setting UI 1600, and the "disabled" preset setting may be displayed as a popup. This allows the administrator user or the like to immediately confirm influence on the existing preset setting when the lock is set.

Figure 15:
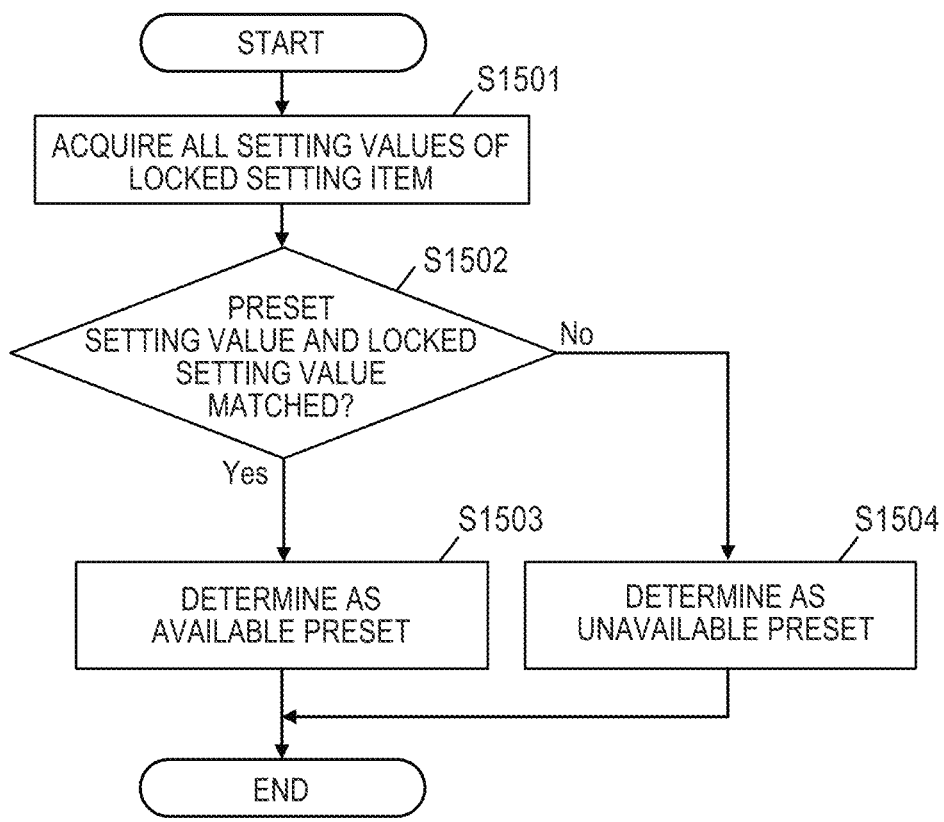
FIG. 15 is a flowchart illustrating a process of determining whether the preset setting is available (second embodiment).

FIG. 15 is a flowchart illustrating details of the process of determining whether or not a preset setting is available even if the preset setting is lock-set in step S1403 of FIG. 14. The process described here is implemented when the software of the UI processing unit 1220 stored in the storage unit 1030 is loaded into the memory 1042 and executed by the CPU 1041.

First, the UI processing unit 1220 acquires setting values stored at the point of time the lock was set for all the lock-set print setting items (S1501). These setting values are the setting values stored in step S1004 of FIG. 10. Next, the UI processing unit 1220 confirms whether or not the setting values of the preset setting and the setting values set at the point of time the lock was set are matched for all the lock-set print setting items (S1502). Accordingly, the UI processing unit 1220 determines that only the preset setting having the same setting values as the locked setting values is available for all the print setting items.

If all the setting values are matched (S1502, Yes), the UI processing unit 1220 determines that the preset setting of interest is available (S1503). On the other hand, if even one of the setting values of the preset setting differs from the locked setting value (S1502, No), the UI processing unit 1220 determines that the preset setting of interest is unavailable (S1504).

Figure 16:
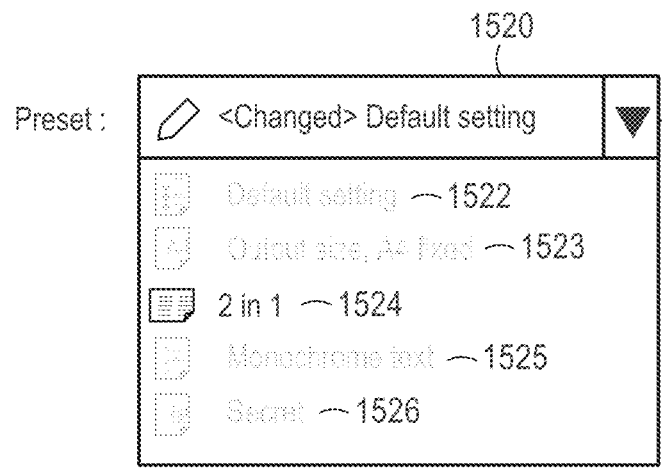
FIG. 16 illustrates an example of a UI displaying selectable preset settings (second embodiment).

FIG. 16 illustrates an example of a preset setting display UI 1520 displaying a selectable preset setting in the lock-set state illustrated in FIG. 11. In this example, the setting value is locked to "2 in 1" for the page layout of the print setting items. Herein, according to the preset setting table 800 (FIG. 8), the preset setting having the setting value "2 in 1" for the page layout is only the preset setting of "2 in 1". Accordingly, in the preset setting display UI 1520, only the preset setting 1524 of "2 in 1" is displayed as being selectable. All the preset settings other than "2 in 1" have a page layout setting value of "1 in 1", which differs from the locked setting value, and thus are determined to be unavailable. Accordingly, in the preset setting display UI 1520, these preset settings 1522, 1523, 1525, and 1526 are grayed out and made non-selectable.

As described above, the second embodiment is configured to make a preset setting having the same setting value as the locked setting value selectable without making all the preset settings non-selectable when some of the print setting items are lock-set. Accordingly, the user is able to select a desired preset setting out of preset settings made selectable.

Third Embodiment

In the second embodiment, the example in which only the preset setting having the same setting value as the locked setting value is made selectable has been described. In contrast, the third embodiment describes an example in which, to increase selectable preset settings, the determination as to whether or not a preset setting is available even if the preset setting is lock-set (S1403) is slightly modified. Note that, since description for FIG. 1 to FIG. 14 is the same as that in the second embodiment, the description thereof will be omitted here.

Figure 17:
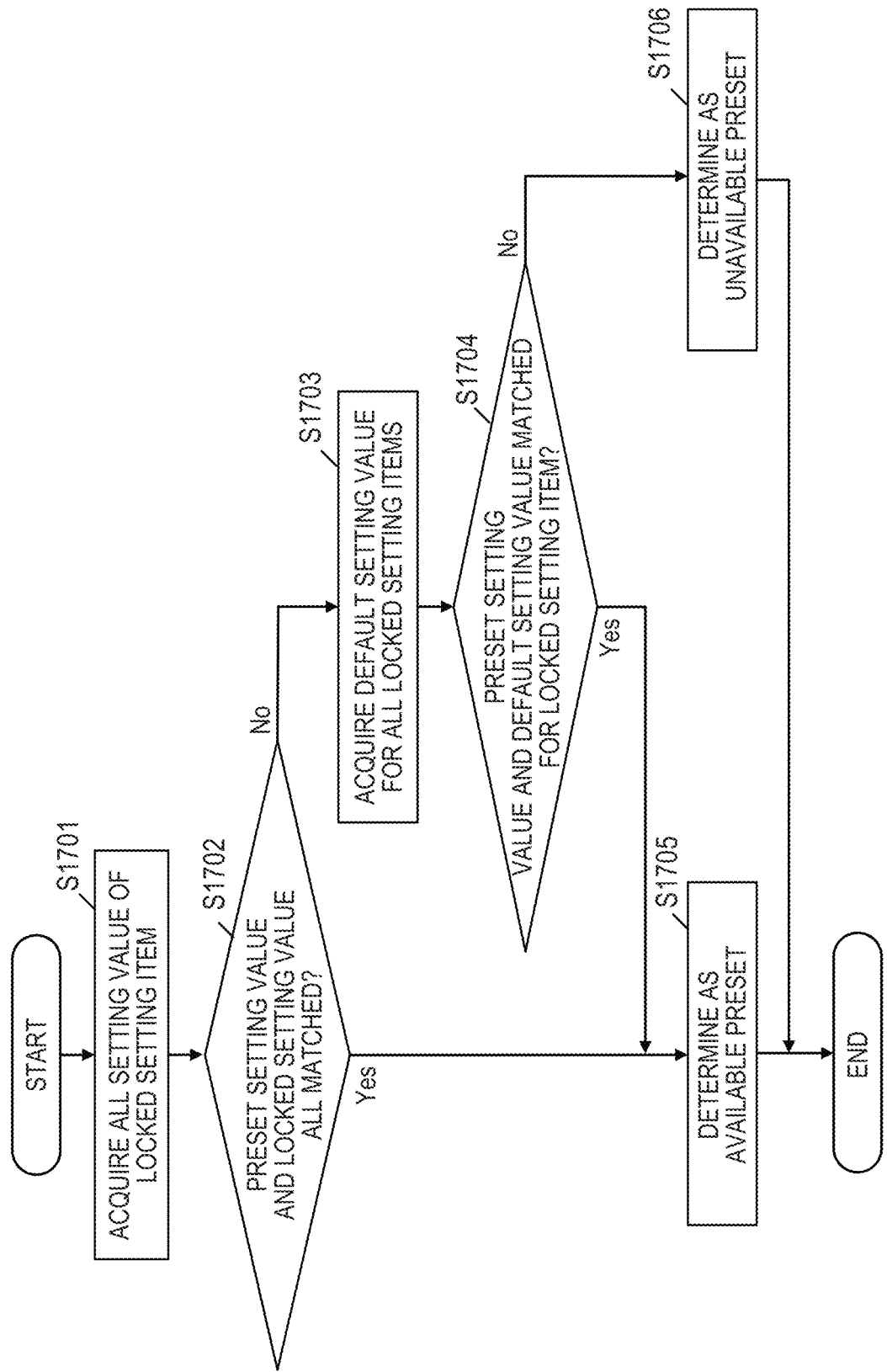
FIG. 17 is a flowchart illustrating a process of determining whether or not the preset setting is available (third embodiment).

FIG. 17 is a flowchart illustrating details of a process of the third embodiment for determining whether or not the preset setting is available even if the preset setting is lock-set in step S1403 of FIG. 14 described in the second embodiment. The flowchart of FIG. 17 corresponds to the flowchart of FIG. 15 in the second embodiment. The process described here is implemented when the software of the UI processing unit 1220 stored in the storage unit 1030 is loaded into the memory 1042 and executed by the CPU 1041.

First, the UI processing unit 1220 acquires setting values stored at the point of time the lock was set for all the lock-set print setting items (S1701). Next, the UI processing unit 1220 confirms whether or not the setting values of the preset and the locked setting values are all matched (S1702). These steps are the same as step S1501 and step S1502 of FIG. 15 in the second embodiment.

If all the setting values are matched (S1702, Yes), the UI processing unit 1220 determines that the preset setting of interest is available (S1705). On the other hand, if even one of the setting values of the preset setting differs from the locked setting value (S1702, No), the UI processing unit 1220 acquires default setting values for all the lock-set print setting items (S1703). In the example of FIG. 11, the lock-set print setting items are "Output sheet size" 1423, "Page layout" 1425, and "Magnification" 1426. Further, for the print setting items described above, the default setting values are "Same as document size", "1 in 1", and "100%", respectively, as with "Default setting" indicated in the preset setting table 800 (FIG. 8).

Next, the UI processing unit 1220 determines whether or not the setting values of the preset setting and the default setting values are match for all the lock-set print setting items (S1704). If all the setting values are matched (S1704, Yes), the UI processing unit 1220 determines that the preset setting of interest is available (S1705). On the other hand, if even one of the setting values of the preset setting differs from the default setting value of the lock-set print setting items (S1704, No), the UI processing unit 1220 determines that the preset setting of interest is unavailable (S1706).

Figure 18:
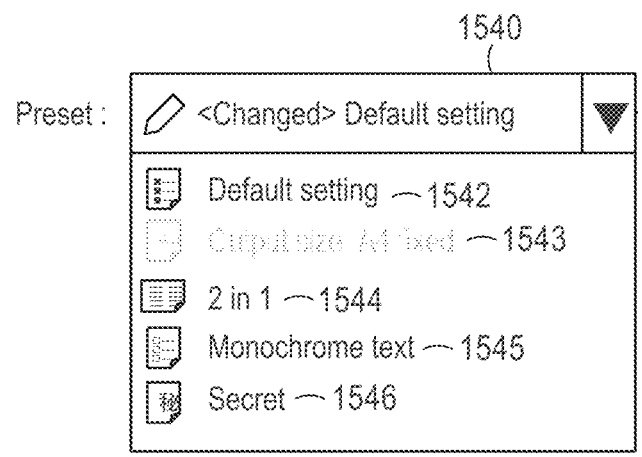
FIG. 18 illustrates an example of a UI displaying selectable preset settings (third embodiment).

FIG. 18 illustrates an example of a preset setting display UI 1540 displaying a selectable preset setting in the third embodiment in a lock-set state illustrated in FIG. 11. In this example, the page layout is locked to "2 in 1" in the same manner as in the second embodiment. Herein, according to the preset setting table 800 (FIG. 8), the preset setting having the setting value ("2 in 1") for all the locked print setting items (the page layout) matches the preset setting of "2 in 1" and thus is determined to be available. Further, for all the preset settings of "Default setting", "Monochrome printing", and "Secret", the setting values of the locked setting item have not been changed from the default setting value ("1 in 1") and thus are determined to be available. Accordingly, in the preset setting display UI 1540 of FIG. 18, respective preset settings 1542, 1544, 1545, and 1546 are displayed as being selectable. On the other hand, the preset setting 1543 of "Output size, A4 fixed" is determined to be unavailable and grayed out as being non-selectable in the preset setting display UI 1540 of FIG. 18.

As described above, the third embodiment is configured to also make a preset setting having no change from the default setting value for the lock-set print setting item selectable when some of the print setting items are lock-set. Accordingly, the user is able to select a preset setting from more choices than in the second embodiment.

According to embodiments of the present disclosure, it is possible to perform print setting using a preset setting even when some of the print setting items are lock-set.

Other Embodiments

Embodiments of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-130028, filed Jul. 31, 2020, which is hereby incorporated by reference herein in its entirety.

What is claimed is:

1. An information processing apparatus comprising:
a controller configured to:
receive a user instruction for setting a setting value of a first print setting item;
enable, according to another user instruction, a function for fixing a setting value of the first print setting item at the setting value that has been set by the received user instruction;
cause a display to display an identifier as an option of a preset function, wherein the identifier is for selecting preset setting values corresponding to the identifier, the preset setting values corresponding to the identifier including another setting value of the first print setting item that is different from the fixed setting value and a setting value of a second print setting item; and
change, based on a selection of the displayed identifier, another setting value of the second print setting item to the setting value of the second print setting item corresponding to the identifier without changing the setting value of the first print setting item, in a case that the function is enabled.

2. The information processing apparatus according to claim 1, wherein the controller is further configured to:
change, based on the selection of the displayed identifier, another setting value of the second print setting item to the setting value of the second print setting item corresponding to the identifier and the setting value of the first print setting item to said another setting value of the first print setting item, in a case that the function is disabled.

3. The information processing apparatus according to claim 1, wherein the controller is further configured to:
generate print data according to the setting value of the second print setting item and the setting value of the first print setting item.

4. The information processing apparatus according to claim 1, wherein the controller is further configured to:
cause the display to display an image indicating that the setting value of the first print setting item is fixed, in a case that the function is enabled.

5. The information processing apparatus according to claim 1, wherein the first print setting item is related to a color mode.

6. The information processing apparatus according to claim 1, wherein the controller prohibits changing the setting value of the first print setting item, in a case that the function is enabled.

7. The information processing apparatus according to claim 1, wherein the controller is further configured to:
cause the display to display a first object corresponding to the first print setting item and a second object corresponding to the second print setting item; and
change, based on the selection of the displayed identifier, a setting value indicated by the second object to the setting value of the second print setting item corresponding to the selected identifier without changing a setting value indicated by the first object, in a case that the function is enabled.

8. The information processing apparatus according to claim 1, wherein the controller is further configured to:
cause the display to display a input screen for inputting a password in a case that a predetermined user operation regarding to the function is received.

9. The information processing apparats according to claim 1, wherein the controller is further configured to:
cause the display to display an image indicating that the first print setting item is an object of the function, in the case that the function is enabled.

10. A controlling method for an information processing apparatus including a controller, the controlling method comprising:
receiving a user instruction for setting a setting value of a first print setting item;
enabling, according to another user instruction, a function for fixing a setting value of the first print setting item at the setting value that has been set by the received user instruction;
causing a display to display an identifier as an option of a preset function, wherein the identifier is for selecting preset setting values corresponding to the identifier, the preset setting values corresponding to the identifier including another setting value of the first print setting item that is different from the fixed setting value and a setting value of a second print setting item; and changing, based on a selection of the displayed identifier, another setting value of the second print setting item to the setting value of the second print setting item corresponding to the identifier without changing the setting value of the first print setting item, in a case that the function is enabled.

11. The controlling method according to claim 10, further comprising:
changing, based on the selection of the displayed identifier, another setting value of the second print setting item to the setting value of the second print setting item corresponding to the identifier and the setting value of the first print setting item to said another setting value of the first print setting item, in a case that the function is disabled.

12. The controlling method according to claim 10, further comprising:
generating print data according to the setting value of the second print setting item and the setting value of the first print setting item.

13. The controlling method according to claim 10, further comprising:
causing the display to display an image indicating that the setting value of the first print setting item is fixed, in a case that the function is enabled.

14. The controlling method according to claim 10, wherein the first print setting item is related to a color mode.

15. The controlling method according to claim 10, further comprising:
prohibiting changing the setting value of the first print setting item, in a case that the function is enabled.

16. A non-transitory computer-readable medium storing a program causing an information processing apparatus to execute a method, the method comprising:
receiving a user instruction for setting a setting value of a first print setting item;
enabling, according to another user instruction, a function for fixing a setting value of the first print setting item at the setting value that has been set by the received user instruction;
causing a display to display an identifier as an option of a preset function, wherein the identifier is for selecting preset setting values corresponding to the identifier, the preset setting values corresponding to the identifier including another setting value of the first print setting item that is different from the fixed setting value and a setting value of a second print setting item; and
changing, based on a selection of the displayed identifier, another setting value of the second print setting item to the setting value of the second print setting item corresponding to the identifier without changing the setting value of the first print setting item, in a case that the function is enabled.

* * * * *